(12) United States Patent
Chavez et al.

(10) Patent No.: US 12,292,156 B2
(45) Date of Patent: May 6, 2025

(54) FIRE RESISTANT SLEEVES

(71) Applicant: GM GLOBAL TECHNOLOGY OPERATIONS LLC, Detroit, MI (US)

(72) Inventors: Alonso Samuel Chavez, San Mateo Atenco (MX); Julio Alberto Moreno, San Luis Potosi (MX); Octavio Addiel Pichardo, Celaya (MX); Ravi Shankar Pandey, Bangalore (IN); Marcus J Baker, Columbiaville, MI (US); Andrew Thomas Cunningham, Cambridge, MA (US); Kyle Sinko, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 18/061,136

(22) Filed: Dec. 2, 2022

(65) Prior Publication Data

US 2024/0183481 A1   Jun. 6, 2024

(51) Int. Cl.
| | |
|---|---|
| *F16L 11/18* | (2006.01) |
| *F16L 57/04* | (2006.01) |
| *B33Y 10/00* | (2015.01) |
| *B33Y 80/00* | (2015.01) |

(52) U.S. Cl.
CPC .............. *F16L 57/04* (2013.01); *F16L 11/18* (2013.01); *B33Y 10/00* (2014.12); *B33Y 80/00* (2014.12)

(58) Field of Classification Search
CPC ........... F16L 57/04; F16L 11/18; B33Y 10/00; B33Y 80/00

USPC .......................................................... 138/110
See application file for complete search history.

(56) References Cited

U.S. PATENT DOCUMENTS

| | | | | |
|---|---|---|---|---|
| 5,197,767 A | * | 3/1993 | Kimura | H02G 11/00 403/114 |
| 5,778,939 A | * | 7/1998 | Hok-Yin | F16L 11/18 138/155 |
| 6,164,570 A | * | 12/2000 | Smeltzer | F16L 11/18 138/120 |
| 6,648,376 B2 | * | 11/2003 | Christianson | E03C 1/06 138/120 |
| 6,854,768 B2 | * | 2/2005 | Elder | B29C 45/0003 285/285.1 |
| 2002/0109023 A1 | * | 8/2002 | Thomas | E03C 1/025 239/588 |
| 2003/0184086 A1 | * | 10/2003 | Christianson | F16L 11/18 285/146.1 |
| 2009/0250924 A1 | * | 10/2009 | Tisbo | F16L 57/02 285/115 |
| 2010/0147446 A1 | * | 6/2010 | Ciolczyk | B29C 49/04 156/244.11 |

(Continued)

*Primary Examiner* — David R Deal
(74) *Attorney, Agent, or Firm* — Lorenz & Kopf LLP

(57) ABSTRACT

Protective sleeves, kits-of-parts for manufacturing sleeves, and methods for manufacturing sleeves are provided. An exemplary protective sleeve includes an inlet end connector; intermediate linking connectors; and an outlet end connector. The intermediate linking connectors are interconnected in a series from the inlet end connector to the outlet end connector; and the inlet end connector, the intermediate linking connectors, and the outlet end connector comprise fire-resistant material.

20 Claims, 7 Drawing Sheets

(56) References Cited

U.S. PATENT DOCUMENTS

2012/0024412 A1* 2/2012 Bertelo ................... F16L 11/18
 138/110
2012/0125470 A1* 5/2012 Nanney ................ F16L 11/087
 138/125

* cited by examiner

FIRE RESISTANT SLEEVES

INTRODUCTION

The technical field generally relates to sleeves, such as hoses or shrouds, and more particularly relates to sleeves for safely removing high temperature materials, such as metal grindings, away from a workspace.

Sleeves, such as hoses or shrouds, may be used with a vacuum force to remove fluids and/or particulate type solids from a workspace. For example, in an industrial metal grinding operation, hot chips may be discarded from the metal workpiece being grinded at a grinding station. The hot chips can be sucked away from the workspace to prevent damage and to keep the workspace clean. Likewise, sparks or weld splatter may be removed from a workspace into a sleeve under vacuum pressure.

These types of sleeves may be used in a wide variety of industrial uses. Therefore, such sleeves may need to be connected to inlet and outlet ports of a wide variety of sizes and structural designs. Further, such sleeves may need to extend over various distances as well as through unique flow paths, whether through or around other industrial equipment and/or through building vents.

While the use of sleeves to vent high-temperature fluids and solids provides many benefits, the production of sleeves customized to specific applications may be cost prohibitive. It would be desirable to develop methods of manufacturing fire-resistant hoses that reduce material waste and provide for improved performance. Also, it would be desirable to provide fire-resistant sleeves and methods of manufacturing fire-resistant sleeves that allow for customized connections, length, flow rates, and other properties. Further, it would be desirable to provide a cost-effective kit-of-parts for manufacturing a fire-resistant sleeve. Furthermore, other desirable features and characteristics of embodiments herein will become apparent from the subsequent detailed description and the appended claims, taken in conjunction with the accompanying drawings and the foregoing technical field and background.

SUMMARY

In an exemplary embodiment, a protective sleeve is provided and includes an inlet end connector; intermediate linking connectors; and an outlet end connector. The intermediate linking connectors are interconnected in a series from the inlet end connector to the outlet end connector. Further, the inlet end connector, the intermediate linking connectors, and the outlet end connector comprise fire-resistant material.

In exemplary embodiments of the protective sleeve, the fire-resistant material is polyetherimide (PEI).

In exemplary embodiments of the protective sleeve, the intermediate linking connectors are standardized and fabricated by additive manufacturing, and the end connectors are customized.

In exemplary embodiments of the protective sleeve, an interface is formed between connectors in each adjacent pair of connectors, and the protective sleeve further comprises an O-ring located at each interface to provide a fluid tight seal.

In exemplary embodiments of the protective sleeve, an interface is formed between connectors in each adjacent pair of connectors, and at each interface a lower end of an upper connector is fitted into an upper end of a lower connector.

In exemplary embodiments of the protective sleeve, each intermediate linking connector in the intermediate linking connectors has a cylindrical wall defining a major barrel portion with a first maximum diameter, a minor barrel portion with a second maximum diameter less than the first maximum diameter, and a belt interconnecting the major barrel portion and the minor barrel portion. Further, an interface is formed between connectors in each adjacent pair of intermediate linking connectors, and at each interface a minor barrel portion of an upper connector is fitted into a major barrel portion of a lower connector.

In exemplary embodiments, the protective sleeve defines a longitudinal axis; an interface is formed between connectors in each adjacent pair of connectors, and the connectors in the adjacent pair of connectors may rotate freely about the longitudinal axis with respect to one another.

In exemplary embodiments, the protective sleeve defines a longitudinal axis; an interface is formed between connectors in each adjacent pair of connectors, a lateral axis perpendicular to the longitudinal axis passes through the interface, and the connectors in the adjacent pair of connectors may rotate by more than 40 degrees about the lateral axis with respect to one another.

In exemplary embodiments, the protective sleeve defines a longitudinal axis; and each end connector is configured to allow a respective adjacent intermediate linking connector to slide longitudinally up to 10 mm while remaining engaged to the respective adjacent end connector.

In exemplary embodiments of the protective sleeve, the intermediate linking connectors are provided with a changing channel diameter to provide a selected flow characteristic of a material flowing through the protective sleeve.

In exemplary embodiments of the protective sleeve, the intermediate linking connectors are provided with a decreasing channel diameter to increase fluid velocity and decrease pressure.

In exemplary embodiments of the protective sleeve, the intermediate linking connectors are provided with an increasing channel diameter to decrease fluid velocity and increase pressure.

Also provided is a kit-of-parts for manufacturing a sleeve. The kit-of-parts includes an inlet end connector having a standardized outlet structure; an outlet end connector having a standardized inlet structure; and intermediate linking connectors. At least a first intermediate linking connector has an inlet structure configured for mating engagement with the standardized outlet structure, and at least a last intermediate linking connector has an outlet structure configured for mating engagement with the standardized inlet structure. The inlet end connector, the intermediate linking connectors, and the outlet end connector comprise fire-resistant material.

In exemplary embodiments of the kit-of-parts, the standardized inlet structure is configured for mating engagement with the standardized outlet structure, and all of the intermediate linking connectors have the standardized outlet structure and the standardized outlet structure.

In exemplary embodiments of the kit-of-parts, the intermediate linking connectors include a series of linking connectors with increasing outlet diameters and increasing inlet diameters and a series of linking connectors with decreasing outlet diameters and decreasing inlet diameters.

In exemplary embodiments of the kit-of-parts, the intermediate linking connectors are fabricated by additive manufacturing.

In exemplary embodiments of the kit-of-parts, when connected the connectors may be aligned on a longitudinal axis, when connected an interface is formed between connectors in each adjacent pair of connectors, the connectors in the adjacent pair of connectors may rotate freely about the longitudinal axis with respect to one another, a lateral axis perpendicular to the longitudinal axis passes through the interface, and the connectors in the adjacent pair of connectors may rotate by more than 40 degrees about the lateral axis with respect to one another.

Also provided is a method for manufacturing a sleeve. The method includes fabricating an inlet end connector having a standardized outlet structure; fabricating an outlet end connector having a standardized inlet structure; and fabricating by additive manufacturing intermediate linking connectors. Each intermediate linking connector has the standardized outlet structure and the standardized inlet structure; and the standardized inlet structure is configured for connection with the standardized outlet structure.

In exemplary embodiments, the method further includes analyzing a structure of a first port and a structure of a second port; designing a customized inlet structure configured for mating engagement with the first port, wherein fabricating the inlet end connector comprises fabricating the inlet end connector having the customized inlet structure; and designing a customized outlet structure configured for mating engagement with the second port, wherein fabricating the outlet end connector comprises fabricating the outlet end connector having the customized outlet structure.

In exemplary embodiments, the method further includes connecting the customized inlet structure of the inlet end connector to the first port; connecting the customized outlet structure of the outlet end connector to the second port; and interconnecting the inlet end connector to the outlet end connector by connecting the intermediate linking connectors therebetween.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated. As used herein, the "%" or "percent" described in the present disclosure refers to the weight percentage unless otherwise indicated. Further, terms such as "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. Also, for ease of description, directional terms such as "inlet", "outlet", "upstream", downstream" and the like refer to an exemplary direction of flow, but may be reversed. Further, such terms do not represent limitations on the scope of the subject matter, as defined by the appended claims. It is noted that while embodiments may be described herein with respect to automotive applications, those skilled in the art will recognize their broader applicability.

Figure 1:
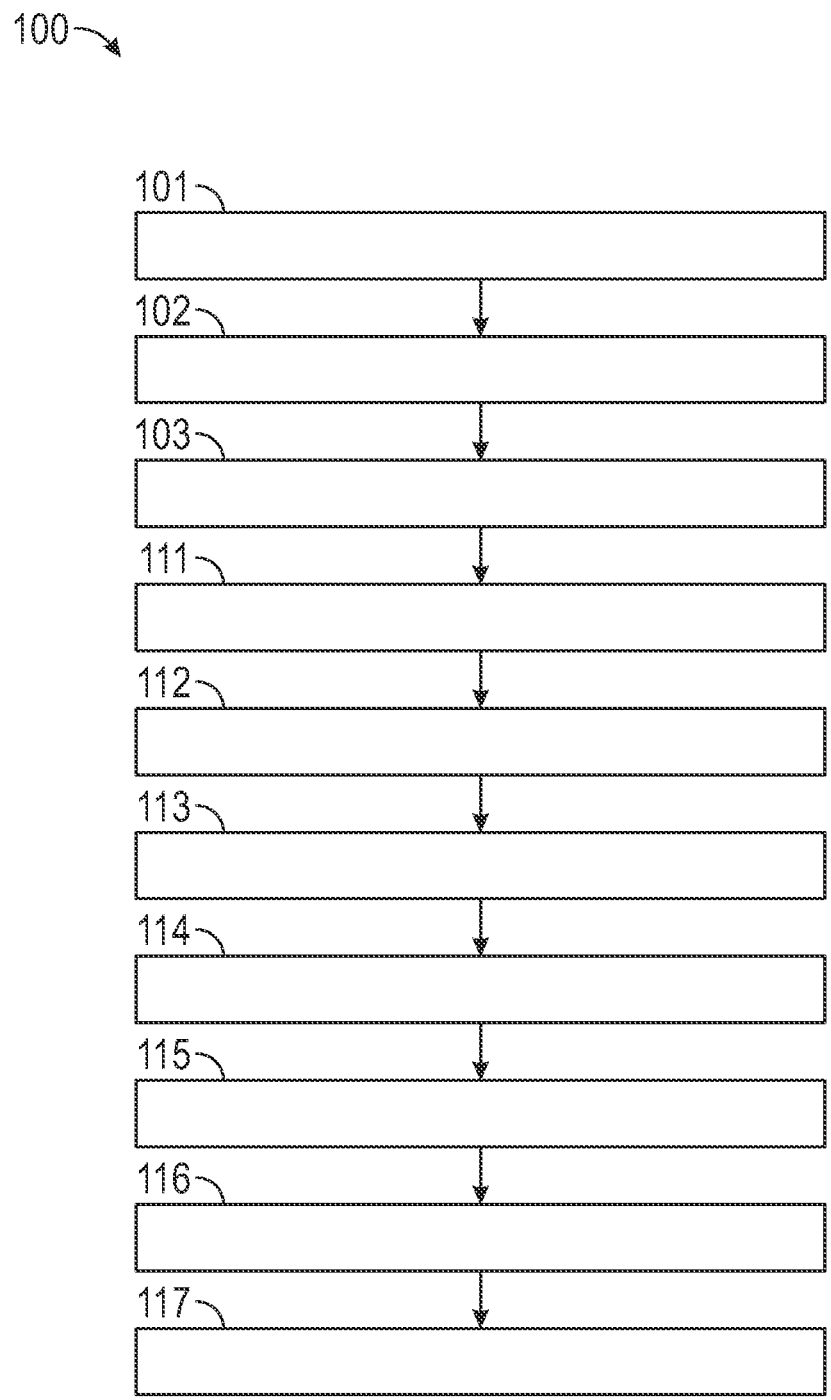
FIG. 1 is a flow chart illustrating a method for manufacturing a fire-resistant sleeve in accordance with an embodiment.
Figure 2:
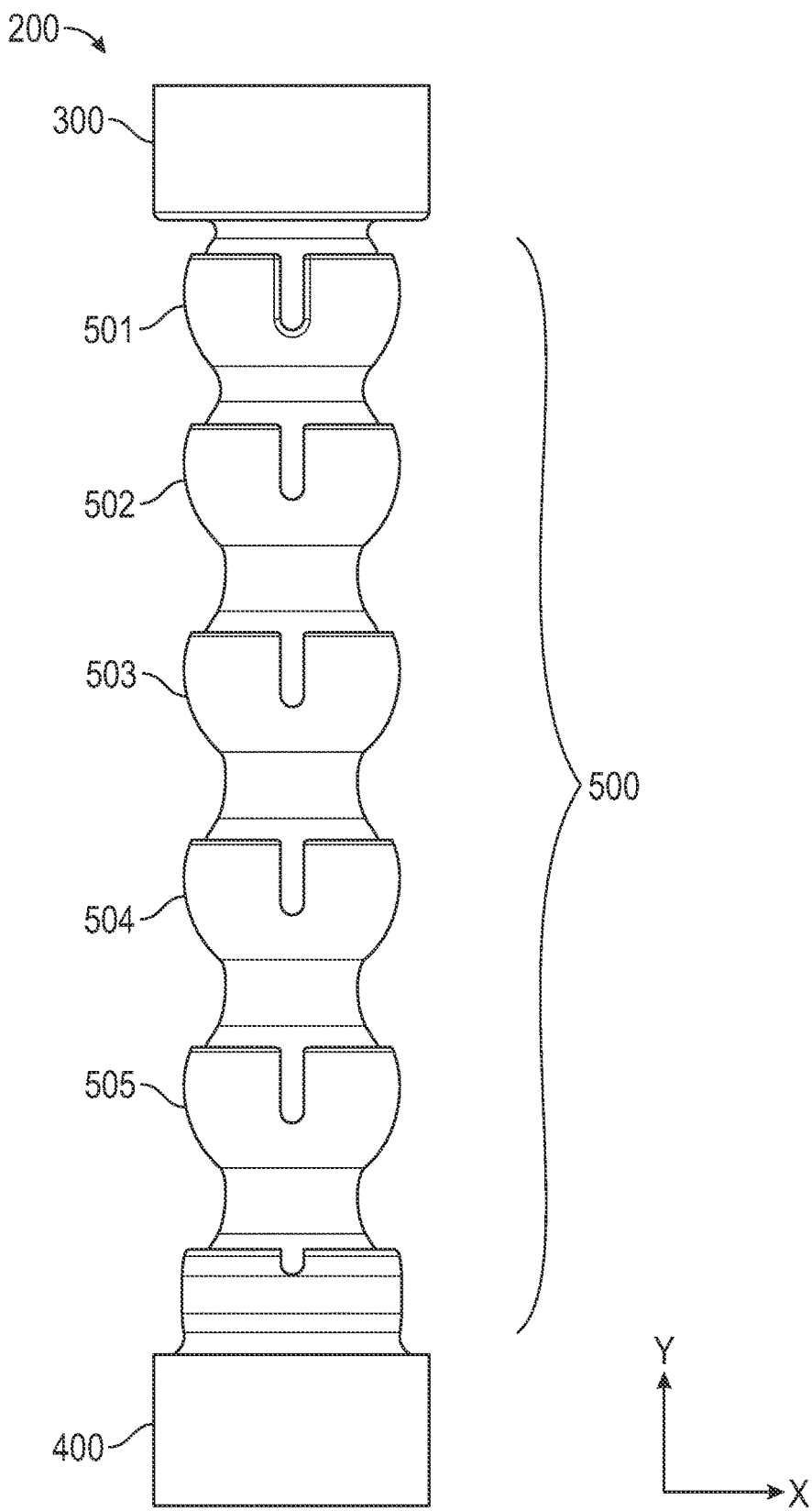
FIG. 2 is a side view of a fire-resistant sleeve in accordance with an embodiment.

For purposes of the discussion that follows, FIG. 1 provides a flow chart for a method 100 for forming a fire-resistant sleeve 200 (as shown in FIG. 2). Method 100 is described below with reference to FIGS. 2-13 which illustrate the fire-resistant sleeve 200 and the components of the fire-resistant sleeve 200. Additional steps may be performed before, after, and/or during method 100.

As shown in FIG. 1, a method 100 for manufacturing a protective sleeve includes, at action block 101, designing standardized inlet structures for intermediate linking connectors and outlet end connectors. Further, at action block 102, method 100 includes designing standardized outlet structures for inlet end connectors and intermediate linking connectors. Designing the standardized inlet structures and standardized outlet structures may be performed in tandem, such that an interlinking chain of connectors is provided. Design considerations may include desired rate of flow through the sleeve, desired properties or characteristics of flow through sleeve, desired number of inlets, desired number of outlets, desired length of the sleeve, and the like. The Figures herein describe a simple sleeve having one inlet, one outlet, and a constant flow diameter at the interface between connectors; however, more complex sleeves are envisioned. For such complex sleeves, standardized inlet and outlet structures may be sequenced to provide for increasing and/decreasing flow channel diameters, channel mergers from more than one inlet, channel splits for more than one outlet, etc.

In certain embodiments, design considerations may be input into a computing device. In such embodiments, the computing device may design the standardized inlet structure and standardized outlet structure according to the design considerations.

Method 100 may continue at action block 103 with storing the standardized structures. For example, the computing device may include a memory that stores a library of standardized structures.

As shown in FIG. 1, method 100 includes, at action block 111, analyzing a structure of a first port and a structure of a second port which will be interconnected by the protective sleeve. For example, the first port may be a mount at a workspace and the second port may be located at a distance from the workspace for removal of materials therefrom. The structures of the first port and second port may include outer diameter dimensions, axial length of features, locations and sizes of ribs or other projections, or other features. Analysis of the structure may include performing manual measurements or automatically measuring features of the structure, such as by capturing images and inputting the images into the computing device. Manual measurements also may be input into the computing device.

Method 100 may further include, at action block 112, designing a customized inlet structure configured for mating engagement with the first port. In an exemplary embodiment, the inlet structure is designed as part of an inlet end connecter. In an exemplary embodiment, action block 112 may further include designing the inlet end connector with a standardized outlet structure. The standardized outlet structure may be selectable from the library of outlet structures stored in a memory.

Method 100 may include, at action block 113, designing a customized outlet structure configured for mating engagement with the second port. In an exemplary embodiment, the outlet structure is designed as part of an outlet end connecter. In an exemplary embodiment, action block 112 may further include designing the outlet end connector with a standardized inlet structure. The standardized inlet structure may be selectable from the library of inlet structures stored in a memory.

In exemplary embodiments, the standardized inlet structure is configured for mating engagement with the standardized outlet structure. In other embodiments, sequences of standardized inlet structures and standardized outlet structures are configured for mating engagement.

In certain embodiments, the designing actions of action blocks 112 and 113 may be performed wholly or partially by the computing device.

Method 100 continues, at action block 114, with fabricating an inlet end connector with the customized inlet structure. In exemplary embodiments, the inlet end connector is fabricated with a selected standardized outlet structure. Further, in exemplary embodiments, the inlet end connector is fabricated using an additive manufacturing process. For example, the inlet end connector may be three-dimensionally printed from a polyetherimide thermoplastic. Alternatively, the inlet end connector may be molded or formed using another suitable process.

Method 100 continues, at action block 115, with fabricating an outlet end connector with the customized outlet structure. In exemplary embodiments, the outlet end connector is fabricated with a selected standardized inlet structure. Further, in exemplary embodiments, the outlet end connector is fabricated using an additive manufacturing process. For example, the outlet end connector may be three-dimensional printed from a polyetherimide thermoplastic. Alternatively, the outlet end connector may be molded or formed using another suitable process.

Method 100 continues, at action block 116, with fabricating a desired number of intermediate linking connectors. In exemplary embodiments, each intermediate linking connector is fabricated with the selected standardized inlet structure and with the selected standardized outlet structure. In exemplary embodiments, the standardized inlet structure is configured for connection with the standardized outlet structure. In exemplary embodiments, the intermediate linking connectors are fabricated using an additive manufacturing process. For example, the intermediate linking connectors may be three-dimensionally printed from a polyetherimide thermoplastic. Alternatively, the intermediate linking connectors may be molded or formed using another suitable process.

While PEI is identified above as an exemplary material other materials may be used. For example, at action blocks 114, 115, and 116, the connectors may be formed from Polyaryle Ether Ketones (PAEK), including Polyetherketone (PEK), Polyetheretherketone (PEEK), Polyetherketoneketone (PEKK), Polyetheretherketoneketone (PEEKK), polyetherketoneetherketoneketone (PEKEKK); polyamides such as nylon; fiber-filled polyamides; polyphenylsulfone (PPSU), polybenzimidazole (PBI); or other suitable thermoplastic materials.

In exemplary embodiments, action blocks 114, 115, and 116 include creation of fabrication instructions by the computing device based on the customized inlet and outlet structures and the standardized inlet and outlet structures, and communication of the instructions to a fabrication device, such as a three-dimensional printer for fabricating the connectors.

Method 100 continues, at action block 117, with interconnecting the connectors to form the sleeve. For example, action block 117 includes connecting the customized inlet structure of the inlet end connector to the first port, connecting the customized outlet structure of the outlet end connector to the second port, and interconnecting the inlet end connector to the outlet end connector by connecting the intermediate linking connectors therebetween.

Method 100 may be used for fabrication of a sleeve having a constant inner diameter. In other embodiments, the sleeve may be formed with an increasing diameter, a decreasing diameter, or with regions having an increasing diameter and regions having a decreasing diameter. In such embodiments, the intermediate linking connectors are provided in defined order within a series, unlike a constant diameter embodiment in which the intermediate linking connectors may be connected in any order.

Referring to FIG. 2, a sleeve 200 is shown after the connectors are interconnected. As illustrated, the sleeve 200 is formed from a first end connector 300 which is configured for mounting to a first port, a second end connector 400 which is configured for mounting to a second port, and intermediate linking connectors 500 that are interconnected and that interconnect the first end connector 300 to the second end connector 400. In the illustrated example, the sleeve 200 includes five intermediate linking connectors 500, numbered 501-505, though any suitable number may be used.

Figure 3:
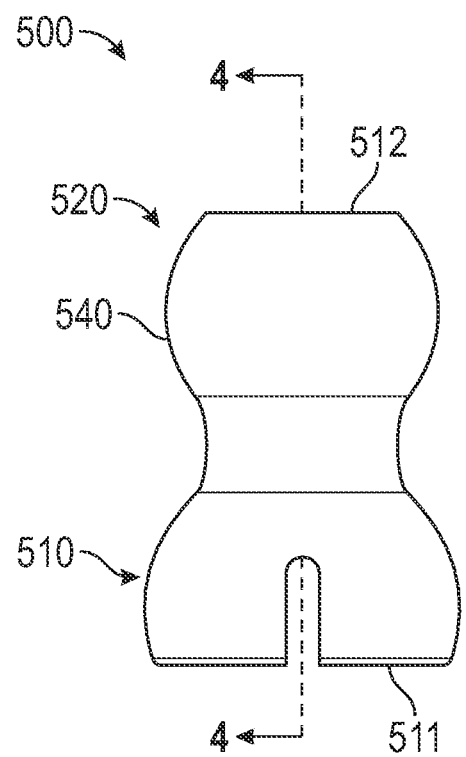
FIGS. 3, 4 and 5 provide a side view, a cross section view, and an end view, respectively of an intermediate linking connector of the fire-resistant sleeve of FIG. 2.
Figure 4:
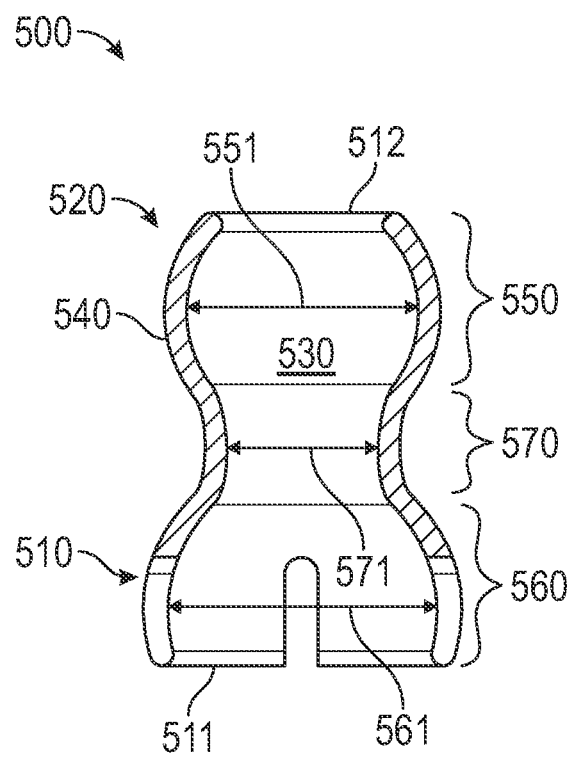
Figure 5:
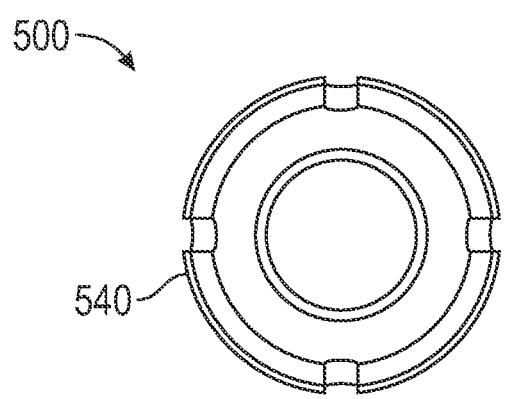

Referring now to FIGS. 3-5, the structure of an exemplary intermediate linking connector 500 is illustrated. The exemplary intermediate linking connector 500 includes an inlet structure 510 defining an inlet 511 and an outlet structure 520 defining an outlet 521. The inlet 511 and outlet 521 are in fluid communication with an internal channel 530 that is bounded by a sidewall 540. An exemplary sidewall 540 is cylindrical with changing inner and outer diameters along its length.

In exemplary embodiments, the channel 530 includes a minor barrel portion 550 having a maximum inner diameter 551 and a major barrel portion 560 having a maximum inner diameter 561. As shown, maximum inner diameter 561 is greater than maximum inner diameter 551. In exemplary embodiments, a hyperboloid region 570 interconnects the minor barrel portion 550 and the major barrel portion 560 and has a belt with a minimum inner diameter 571 that is less than the diameter of the inlet 511 and less than the diameter of the outlet 521.

Figure 6:
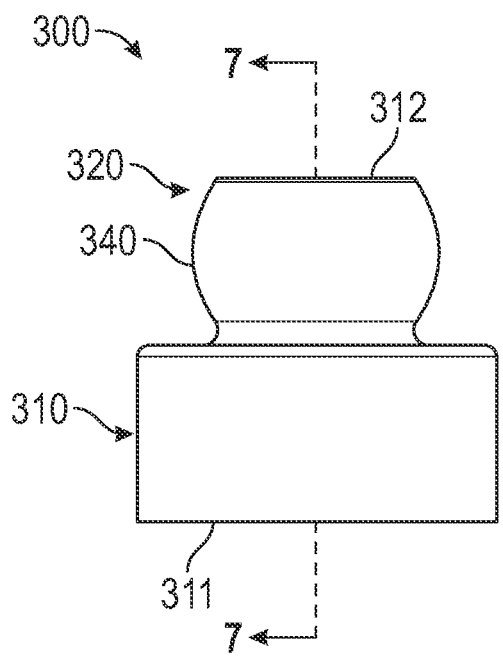
FIGS. 6, 7 and 8 provide a side view, a cross section view, and an end view, respectively of an inlet connector of the fire-resistant sleeve of FIG. 2.
Figure 7:
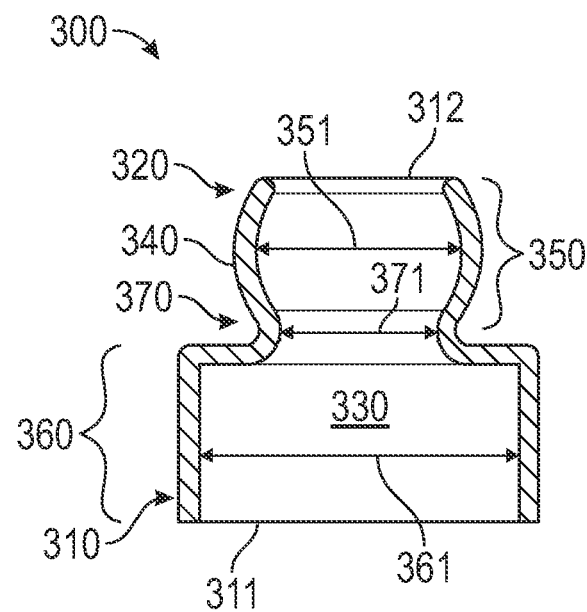
Figure 8:
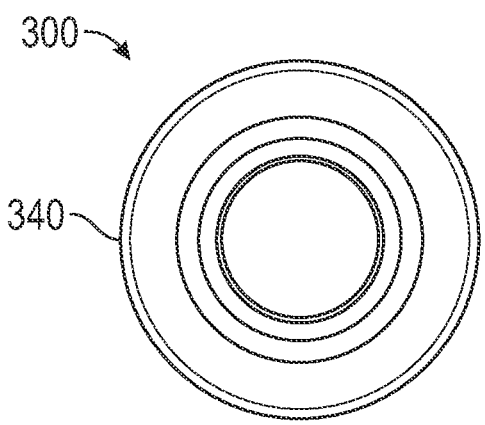

Referring to FIGS. 6-8, the structure of an exemplary inlet connector 300 is illustrated. The exemplary inlet connector 300 includes an inlet structure 310 defining an inlet 311 and an outlet structure 320 defining an outlet 321. The inlet 311 and outlet 321 are in fluid communication with an internal channel 330 that is bounded by a sidewall 340. An exemplary sidewall 340 is cylindrical with changing inner and outer diameters along its length.

In exemplary embodiments, the channel 330 includes a minor barrel portion 350 having a maximum inner diameter 351 and a major barrel portion 360 having a maximum inner diameter 361. As shown, maximum inner diameter 361 is greater than maximum inner diameter 351. In exemplary embodiments, a belt region 370 interconnects the minor barrel portion 350 and the major barrel portion 360 and has a belt with a minimum inner diameter 371 that is less than the diameter of the inlet 311 and less than the diameter of the outlet 321.

Figure 9:
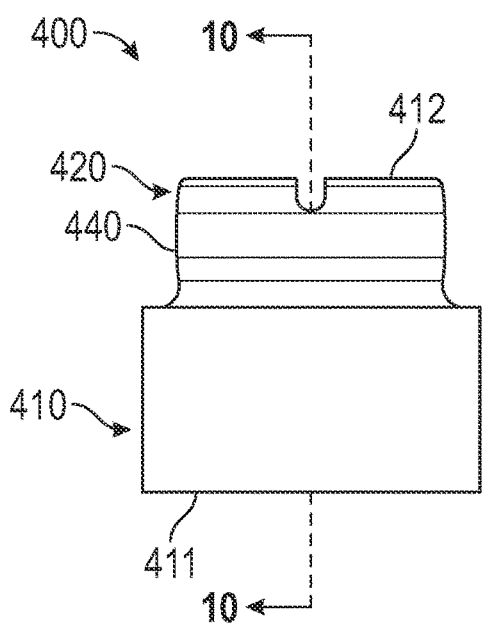
FIGS. 9, 10 and 11 provide a side view, a cross section view, and an end view, respectively of an outlet connector of the fire-resistant sleeve of FIG. 2.
Figure 10:
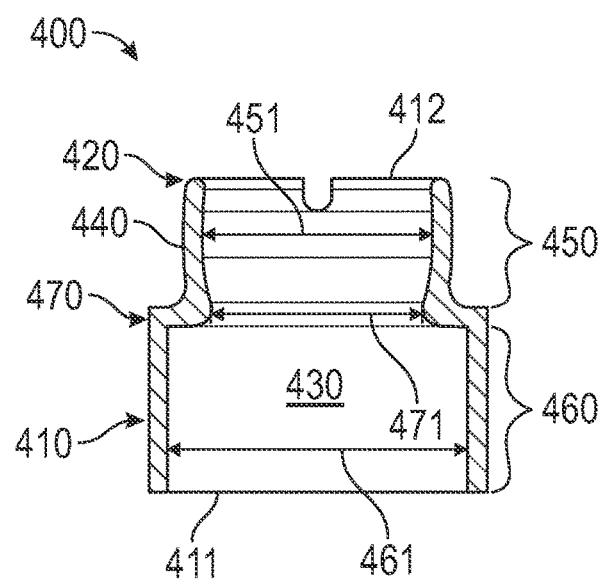
Figure 11:
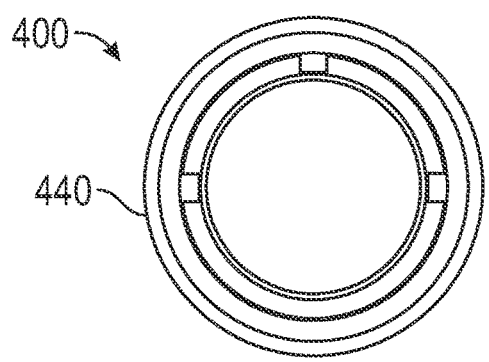

Referring to FIGS. 9-11, the structure of an exemplary outlet connector 400 is illustrated. The exemplary outlet connector 400 includes an inlet structure 410 defining an inlet 411 and an outlet structure 420 defining an outlet 421. The inlet 411 and outlet 421 are in fluid communication with an internal channel 430 that is bounded by a sidewall 440. An exemplary sidewall 440 is cylindrical with changing inner and outer diameters along its length.

In exemplary embodiments, the channel 430 includes a minor barrel portion 450 having a maximum inner diameter 451 and a major barrel portion 460 having a maximum inner diameter 461. As shown, maximum inner diameter 461 is greater than maximum inner diameter 451. In exemplary embodiments, a belt region 470 interconnects the minor barrel portion 450 and the major barrel portion 460 and has a belt with a minimum inner diameter 471 that is less than the diameter of the inlet 411 and less than the diameter of the outlet 421.

Figure 12:
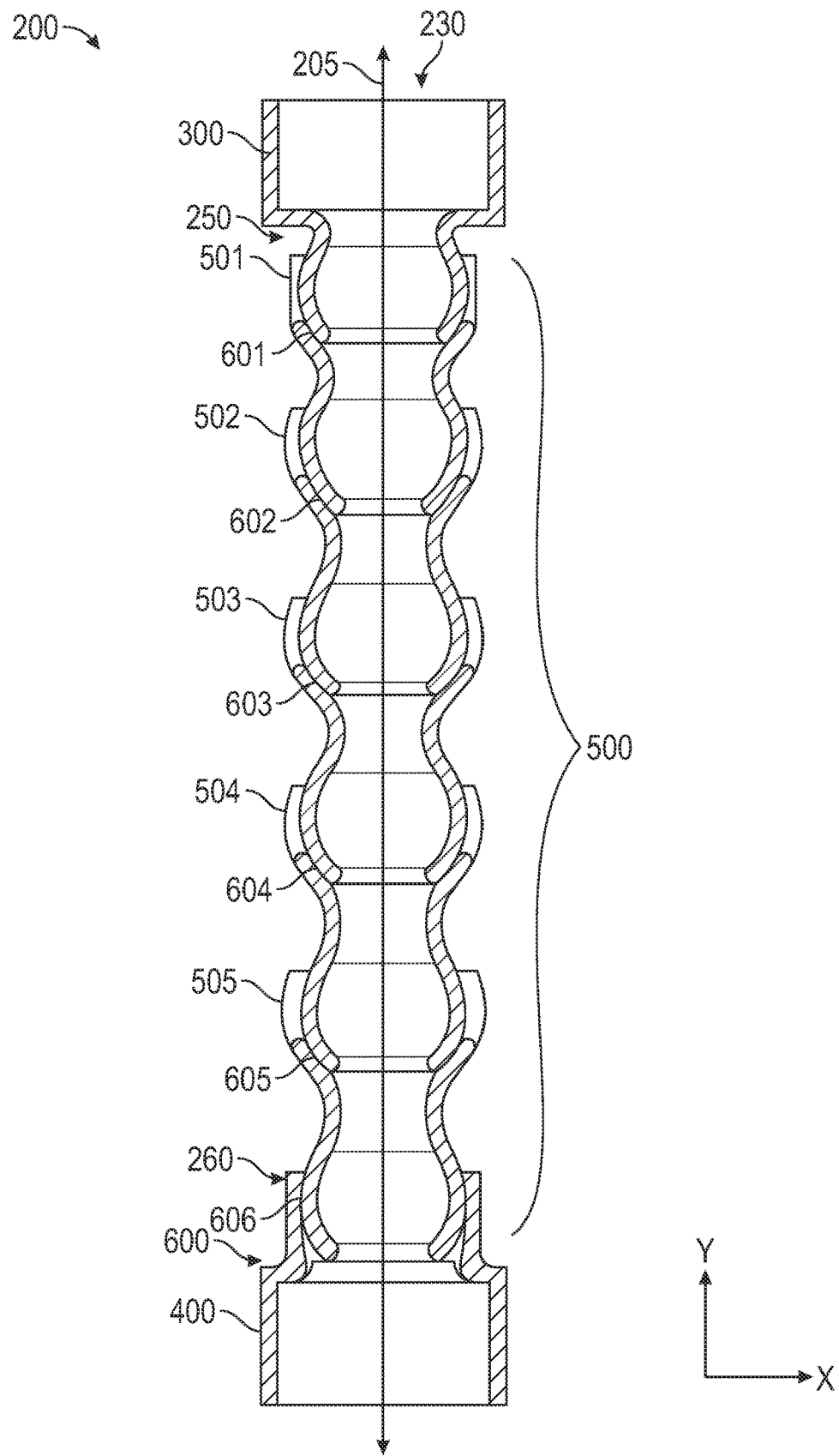
FIG. 12 provides a cross section view of the fire-resistant sleeve of FIG. 2 in accordance with an embodiment.

FIG. 12 is a cross-sectional view of the sleeve of FIG. 2. As shown, a flow channel 230 is formed by sleeve 200 and extends along a longitudinal axis 205 in the direction of the Y-axis. Cross-referencing FIGS. 2-12, it may be seen that interfaces 600 are formed between adjacent, interconnected connectors, such as interface 601 between connectors 300 and 501, interface 602 between connectors 501 and 502, interface 603 between connectors 502 and 503, interface 604 between connectors 503 and 504, interface 605 between connectors 504 and 505, interface 606 between connectors 505 and 400. At each interface 601-606, the respective connectors are configured to freely rotate about the longitudinal axis 205.

Further, as shown in FIG. 12, the sleeve 200 is designed with a clearance gap 250 between the inlet connector 300 and the intermediate linking connector 501 to allow for relative movement of the inlet connector 300 and the intermediate linking connector 501 toward one another along the axis 205. Also, the sleeve 200 is designed with a clearance structure 260 between the outlet connector 400 and the intermediate linking connector 505 to allow for relative movement of the outlet connector 400 and the intermediate linking connector 505 away from one another along the axis 205. In an exemplary embodiment, the clearance gap 250 and clearance structure 260 allow for 10 millimeters of axial movement without disengagement. As a result, sleeve 200 may withstand tensile and compressive forces without disengaging from a port or along an interface.

Figure 13:
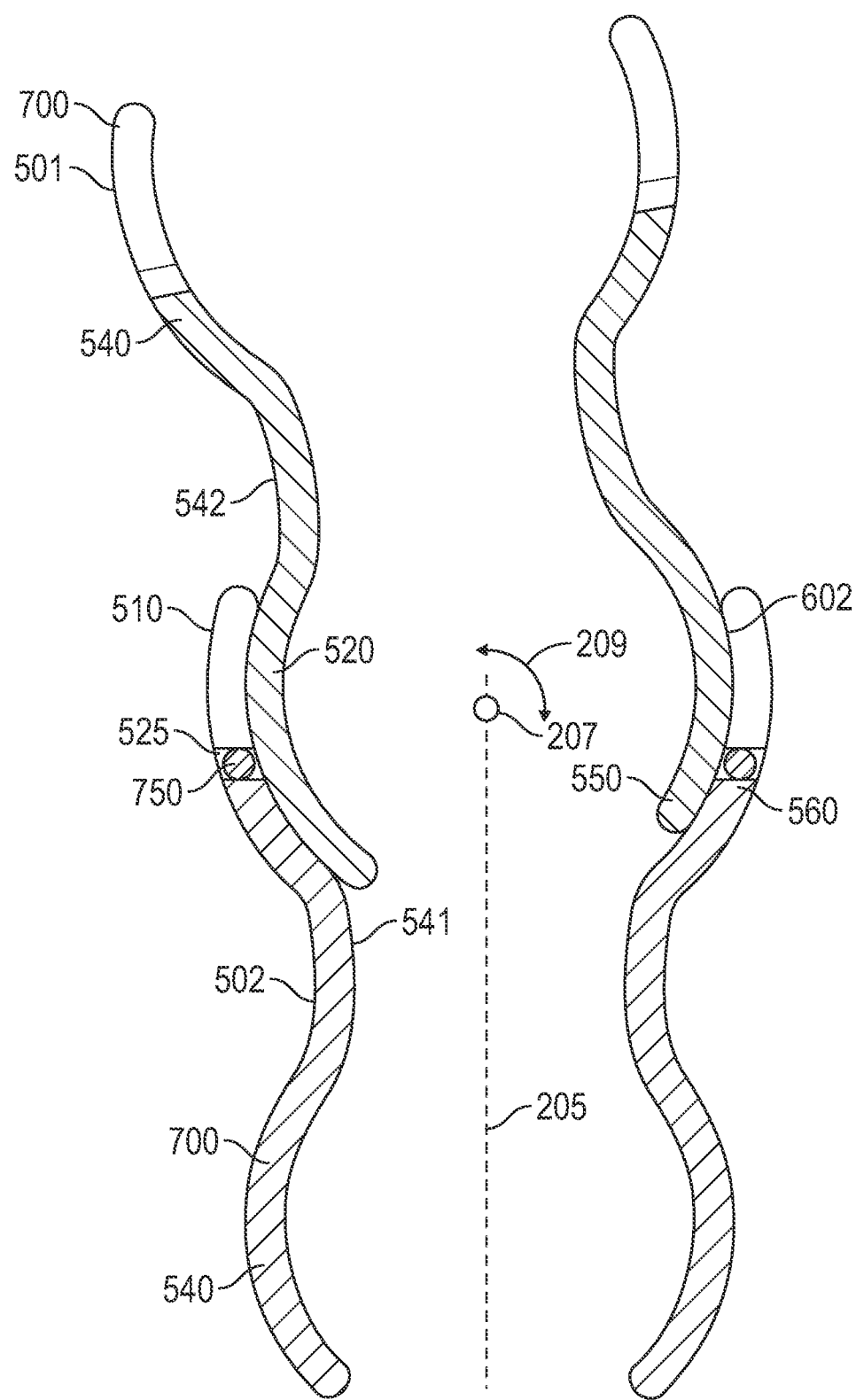
FIG. 13 provides a cross section view of two adjacent connectors of the fire-resistant sleeve of FIGS. 2 and 12 in accordance with an embodiment.

Referring to FIG. 13, a focused view of two adjacent connectors 700 and the interface 600 therebetween is illustrated. In FIG. 13, the illustrated adjacent connectors 700 are intermediate linking connector 501 and intermediate linking connector 502 and the interface is interface 602; however, the illustration is representative of any pair of adjacent connectors and interface of the sleeve 200.

As shown in FIG. 13, the outlet structure 520 of connector 501 is received within the inlet structure 510 of connector 502 to form interface 602. Specifically, an outer surface 542 of sidewall 540 of connector 501 fits in and slides against an inner surface 541 of sidewall 540 of connector 502. Therefore, connectors 501 and 502 are free to rotate about longitudinal axis 205.

To provide for engagement between the two adjacent connectors 700 while rotating and pivoting, the inner surface 541 of the major barrel portion 560 of connector 502 receives and mates with the outer surface 542 of the minor barrel portion 550 of connector 501. In other words, the sloping inner diameter of the major barrel portion 560 of connector 502 matches the sloping outer diameter of the minor barrel portion 550 of connector 501.

As shown, with the geometric design of the inlet structure 510 and the outlet structure 520, sleeve 200 allows for pivoting about lateral axis 207 (a Z-axis) in the direction of arrow 209 by the interconnected adjacent connectors 501 and 502 relative to one another. In exemplary embodiments, the connectors 501 and 502 may be pivoted over 40 degrees about axis 207 relative to one another while maintaining engagement to one another. Exemplary interconnected adjacent connectors 700 may be pivoted over 10 degrees, over 15 degrees, over 20 degrees, over 25 degrees, over 30 degrees, over 35 degrees, or over 40 degrees, and less than 50 degrees, about axis 207 relative to one another while maintaining engagement to one another.

As shown in FIG. 13, the outlet structure 520 may be formed with a groove 525 in which a compressive O-ring 750 may be located to provide fluid-tight engagement with the respective inlet structure 510 at the interface. While the O-ring 750 and groove 525 are illustrated, other structural arrangements may be used to maintain fluid-tight engagement.

As described herein, embodiments provide for fire-resistant sleeves, kits-of-parts for manufacturing fire-resistant sleeves, and methods for manufacturing fire-resistant sleeves. Embodiments of the present disclosure offer advantages over the existing art, though it is understood that other embodiments may offer different advantages, not all advantages are necessarily discussed herein, and no particular advantage is required for all embodiments.

Embodiments herein are related to protective sleeves, such as hoses or sheaths, for conveying high temperature fluids and/or particulate solids, including burning materials and/or incandescent materials or sparks. Typical hoses are prone to melting or combusting in environments containing flames, sparks, weld splatter and/or hot chips. Typical fire-resistant hoses may withstand such an environment but cannot freely rotate, may emit toxic smoke in an overheating scenario, and may not resist chemical or impact exposure. Further, neither type of hose typically provides the design freedom of custom-fit end connectors which may be needed in industrial uses.

Embodiments herein may utilize a combination of material selection, design innovations, and manufacturing methods to provide a sleeve that has improved high temperature, fire, chemical, and impact resistance, 360 degree articulation, complete end connector customization capability, and non-toxic emissions in the case of an unexpected thermal event.

Embodiments herein may reduce sleeve burning incidents, thus increasing employee safety while safeguarding capital manufacturing equipment. In exemplary embodiments, the sleeve will not emit toxic smoke when in direct contact with fire.

In exemplary embodiments, the sleeve is formed from a very durable, high strength, and impact resistant material. In certain embodiments, the sleeve is formed from polyetherimide, a semi-transparent high strength plastic material.

In certain embodiments, the sleeve may be used to protect hoses and wires, located within the sleeve, from exposure to flames, heat, chemicals, and/or mechanical impact.

In exemplary embodiments, the intermediate linking connectors of the sleeve are fabricated by additive manufacturing, i.e., three-dimensional printing. In certain embodiments, the end connectors of the sleeve are also fabricated by additive manufacturing. In other embodiments, the end connectors of the sleeve may be fabricated by a molding process. For embodiments utilizing additive manufacturing, a sleeve of a selected structure and dimension may be quickly designed and manufactured.

In certain embodiments, packaging of the sleeve may be improved due to the freedom of rotation and degree of pivoting between adjacent connectors.

In exemplary embodiments, the sleeve can withstand tensile or compressive forces in the longitudinal direction of the sleeve with being damaged or becoming disengaged due to a sliding buffer along the sleeve length.

In exemplary embodiments, the flow of material through the sleeve can be tuned to exhibiting desired properties via forming internal printed-in-place features and/or through changing internal diameters of connectors.

Exemplary sleeves are safe to touch while in use, particularly in comparison to fireproof metal pipes, and require significantly more thermal energy in order to cause a contact burn.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A protective sleeve comprising:
an inlet end connector;
intermediate linking connectors; and
an outlet end connector;
wherein the intermediate linking connectors are interconnected in a series from the inlet end connector to the outlet end connector; wherein the inlet end connector, the intermediate linking connectors, and the outlet end connector comprise a material; wherein the protective sleeve defines a longitudinal axis; and wherein each end connector is configured to allow a respective adjacent intermediate linking connector to slide longitudinally up to 10 mm while remaining engaged to the respective adjacent end connector.

2. The protective sleeve of claim 1, wherein the material is polyetherimide (PEI).

3. The protective sleeve of claim 1, wherein the intermediate linking connectors are standardized and fabricated by additive manufacturing, and wherein the end connectors are customized.

4. The protective sleeve of claim 1, wherein an interface is formed between connectors in each adjacent pair of connectors, and wherein the protective sleeve further comprises an O-ring located at each interface to provide a fluid tight seal.

5. The protective sleeve of claim 1, wherein an interface is formed between connectors in each adjacent pair of connectors, wherein at each interface a lower end of an upper connector is fitted into an upper end of a lower connector.

6. The protective sleeve of claim 1, wherein each intermediate linking connector has a cylindrical wall defining a major barrel portion with a first maximum diameter, a minor barrel portion with a second maximum diameter less than the first maximum diameter, and a belt interconnecting the major barrel portion and the minor barrel portion, wherein an interface is formed between connectors in each adjacent pair of intermediate linking connectors, and wherein at each interface a minor barrel portion of an upper connector is fitted into a major barrel portion of a lower connector.

7. The protective sleeve of claim 1, wherein an interface is formed between connectors in each adjacent pair of connectors, and wherein the connectors in the adjacent pair of connectors may rotate freely about the longitudinal axis with respect to one another.

8. The protective sleeve of claim 1, wherein an interface is formed between connectors in each adjacent pair of connectors, wherein a lateral axis perpendicular to the longitudinal axis passes through the interface, and wherein the connectors in the adjacent pair of connectors may rotate by more than 40 degrees about the lateral axis with respect to one another.

9. The protective sleeve of claim 1, wherein the intermediate linking connectors include a series of linking connectors with increasing outlet diameters and increasing inlet diameters and a series of linking connectors with decreasing outlet diameters and decreasing inlet diameters.

10. The protective sleeve of claim 1, wherein the intermediate linking connectors are provided with a changing channel diameter to provide a selected flow characteristic of a material flowing through the protective sleeve.

11. The protective sleeve of claim 1, wherein the intermediate linking connectors are provided with a decreasing channel diameter to increase fluid velocity and decrease pressure.

12. The protective sleeve of claim 1, wherein the intermediate linking connectors are provided with an increasing channel diameter to decrease fluid velocity and increase pressure.

13. A kit-of-parts for manufacturing a sleeve, the kit-of-parts comprising:
  an inlet end connector having a standardized outlet structure;
  an outlet end connector having a standardized inlet structure; and
  intermediate linking connectors, wherein at least a first intermediate linking connector has an inlet structure configured for mating engagement with the standardized outlet structure, wherein at least a last intermediate linking connector has an outlet structure configured for mating engagement with the standardized inlet structure, wherein the inlet end connector, the intermediate linking connectors, and the outlet end connector comprise a material, and wherein the intermediate linking connectors include a series of linking connectors with increasing outlet diameters and increasing inlet diameters and a series of linking connectors with decreasing outlet diameters and decreasing inlet diameters.

14. The kit-of-parts of claim 13, wherein the standardized inlet structure is configured for mating engagement with the standardized outlet structure, and wherein all of the intermediate linking connectors have the standardized outlet structure and the standardized outlet structure.

15. The kit-of-parts of claim 13, wherein the intermediate linking connectors are configured for interconnection in a series from the inlet end connector to the outlet end connector to form a protective sleeve defining a longitudinal axis; and wherein each end connector is configured to allow a respective adjacent intermediate linking connector to slide longitudinally up to 10 mm while remaining engaged to the respective adjacent end connector.

16. The kit-of-parts of claim 13, wherein the intermediate linking connectors are fabricated by additive manufacturing.

17. The kit-of-parts of claim 13, wherein when connected the connectors may be aligned on a longitudinal axis, wherein when connected an interface is formed between connectors in each adjacent pair of connectors, wherein the connectors in the adjacent pair of connectors may rotate freely about the longitudinal axis with respect to one another, wherein a lateral axis perpendicular to the longitudinal axis passes through the interface, and wherein the connectors in the adjacent pair of connectors may rotate by more than 40 degrees about the lateral axis with respect to one another.

18. The kit-of-parts of claim 17, wherein when connected each end connector allows a respective adjacent intermediate linking connector to slide longitudinally up to 10 mm while remaining engaged to the respective adjacent end connector.

19. The kit-of-parts of claim 13, wherein the material is polyetherimide (PEI).

20. The kit-of-parts of claim 13, further comprising an O-ring, wherein at least one intermediate linking connector has an intermediate outlet structure formed with a groove, and wherein the groove is configured to receive the O-ring.

* * * * *